US005312028A

United States Patent [19]

Hume

[11] Patent Number: 5,312,028

[45] Date of Patent: May 17, 1994

[54] HIGH PRESSURE VISCOUS LIQUID PUMP

[76] Inventor: James M. Hume, 4950 Porter Rd., St. Augustine, Fla. 32084

[21] Appl. No.: 963,848

[22] Filed: Oct. 20, 1992

[51] Int. Cl.$^5$ .............................................. G01F 11/00

[52] U.S. Cl. ......................................... 222/326; 222/1; 222/389

[58] Field of Search ............... 222/256, 259, 326, 386, 222/389, 1; 414/417

[56] References Cited

U.S. PATENT DOCUMENTS

| | | | |
|---|---|---|---|
| 2,003,617 | 6/1935 | Toews | 222/386 |
| 2,221,763 | 11/1940 | Ginter | 222/259 X |
| 2,630,248 | 3/1953 | Hinz | 222/389 X |
| 3,904,083 | 9/1975 | Little | 222/326 X |
| 3,982,669 | 9/1976 | Moore | 222/389 X |
| 4,632,281 | 12/1986 | Wold | 222/389 |
| 4,978,042 | 12/1990 | Fidler | 222/642 |
| 5,178,305 | 1/1993 | Keller | 222/386 |

*Primary Examiner*—Andres Kashnikow

*Assistant Examiner*—Joseph A. Kaufman

*Attorney, Agent, or Firm*—Charles J. Prescott

[57] ABSTRACT

A single stroke pressure viscous liquid pump for discharging highly viscous and filled, abrasive liquids under pressure sufficient for spray coating a surface with such liquids. The device includes an upright liquid tank having an open upper end positioned atop a base plate of a frame in coaxial alignment spaced directly beneath a pressure cylinder which includes an axially movable ram having a piston at its lower end. The piston is sized to sealingly engage the inner surface of the tank whereby downward axial force generated by the ram is transmitted directly against the upper surface of the liquid within the tank. A discharge outlet near the bottom of the tank is connectable to a conduit and liquid spray nozzle for spray application of the pressurized liquid discharged from the tank outlet. Only a single downstroke of the ram is required at a very slow feed rate to empty the tank of liquid, thus eliminating virtually all heat buildup.

6 Claims, 6 Drawing Sheets

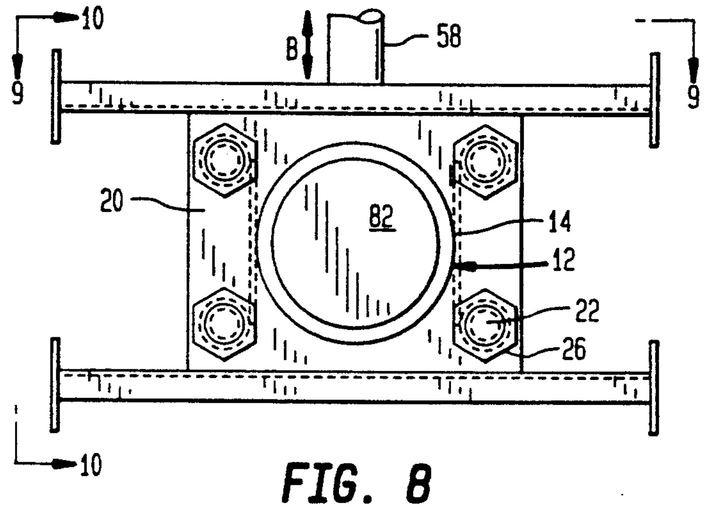
FIG. 8
FIG. 9
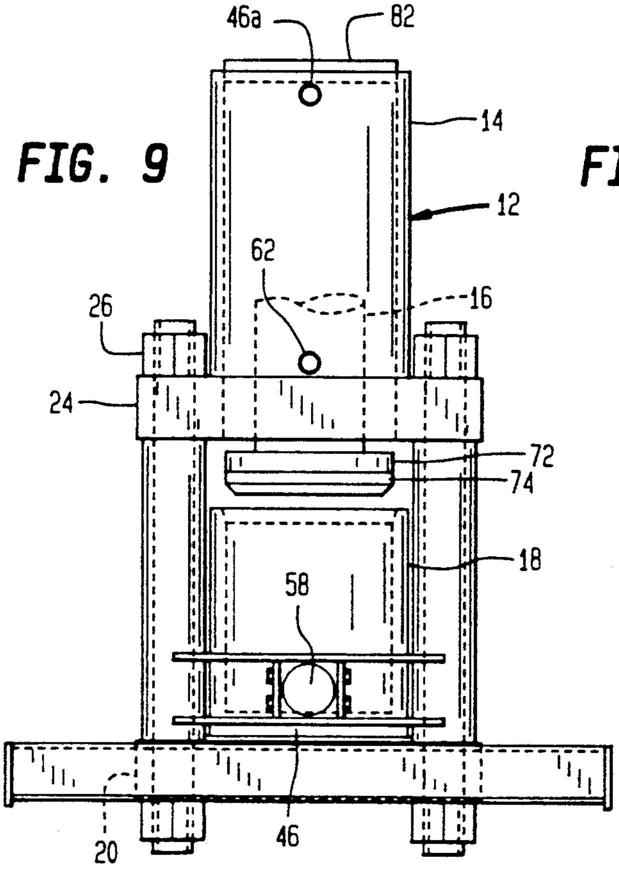
FIG. 10
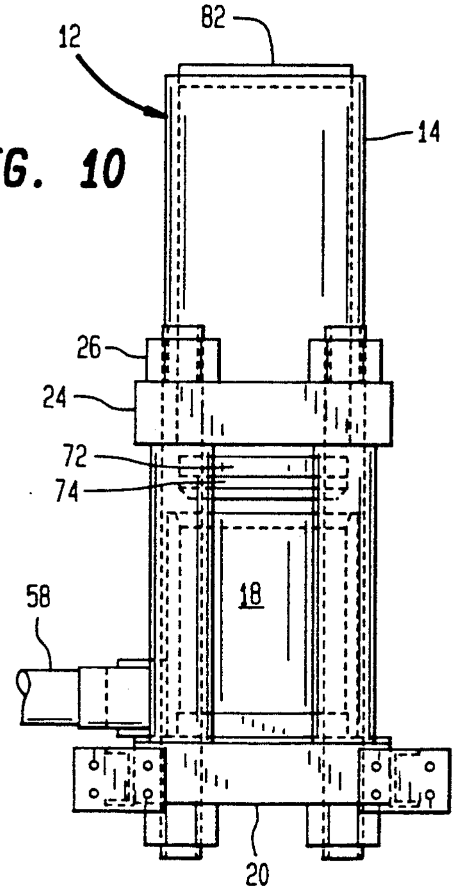

HIGH PRESSURE VISCOUS LIQUID PUMP

BACKGROUND OF THE INVENTION

This invention relates generally to spray paint devices and other liquid coating spray pumps, and more particularly to a high-pressure liquid pump for the spray application of highly viscous and abrasive liquid materials.

The spray application of highly viscous liquids and/or those liquids containing relatively high amounts of abrasive filler material such as filled industrial coatings has become well-known. These coatings, such as those formulated of two part epoxy or polyester, are typically extremely thick, e.g., having a minimum viscosity of 500 c.p.s. Because of the added filler materials, these coatings are not only highly viscous, but are also extremely abrasive to equipment due to the presence of filler.

Typically, if not applied by brush or roller or other hand means, conventional airless pumps are available for the spray application of such heavy viscous liquids. These pumps deliver an average of two pints of liquid per stroke, accomplished by a reciprocating piston which cycles back and forth for each relatively small quantity of liquid delivered.

Because of the relatively long stroke length, e.g. approximately 6 inches, and rapid cycling of the piston, detrimental heat of friction results by the piston seal or packing moving against the barrel or cylinder of the pump. This heat build-up prematurely accelerates the polymerization of many of these two-part coatings. Additionally, the abrasive nature of these filled coatings results in the rapid deterioration of the relatively fast moving components of such pumps. Further, each time the piston within these airless pumps reverses itself, a pressure drop results in the reduction of the spray fan pattern emanating from the spray nozzle, causing runs and discontinuities in the coating.

Atomized equipment is also available which utilizes a lower pressure pump to deliver the coating liquid to the nozzle of a spray gun whereupon pressurized air blows it out of the nozzle for distribution. This type of equipment is typically of relatively slow production rate and is easily contaminated by water and oil contained within the atomization airstream.

A liquid dispensing device is disclosed in U.S. Pat. No. 1,984,296 to Witter which discloses a single stroke dispenser for low viscous liquids activated by a separate pneumatic piston arrangement.

The grease pump disclosed by Wold in U.S. Pat. No. 2,235,544 is concerned with a pump adapted for delivery of heavy greases which is valve activated.

In U.S. Pat. No. 2,406,747, Davis discloses an improved valve mechanism for pneumatic motors.

Young teaches a fluid pressure actuated control apparatus disclosed in U.S. Pat. No. 2,987,047 having a moveable wall within its chamber for controlling pressure.

A paint pumping system is disclosed by Hortvet in U.S. Pat. No. 3,424,092 teaching a single stroke hydraulic piston pressure intensifier having its piston connected to the piston of the main piston pump. Paint is drawn in during retracting stroke of the piston and forced out of the cylinder during the working stroke under high pressure. This thus appears to be a reciprocating piston airless type device as above generally described.

A pneumatically assisted hydraulic atomizing device is disclosed in U.S. Pat. No. 3,843,052 invented by Cowan and is as above generally described types of spray apparatus.

In U.S. Pat. No. 4,416,588, Karliner has invented a combination airless paint pump and air compressor utilizing an eccentric cam wheel to drive a small piston and then a diaphragm type pump.

Geberth, in U.S. Pat. No. 4,768,929 discloses a high pressure paint pump of the atomization type generally described above. Geberth, in an immediately subsequent U.S. Pat. No. 4,768,932, has also invented a hydraulic airless paint pump utilizing an improved valve permitting the reciprocating piston pump to be more easily self-priming.

Liska, in U.S. Pat. No. 4,785,997, teaches an improved hydraulic motor for airless paint sprayer systems of the reciprocating piston type.

None of the above-described prior art devices afford effective and efficient pressurized spray delivery of highly viscous coating materials at constant high volume without excessive heat buildup and/or absent excessive equipment maintenance and wear.

The present invention discloses a truly single stroke low friction high pressure pump for very highly viscous and abrasively filled liquids such as two part epoxies on polyester liquid materials which, by its high volume and slow feed characteristics, virtually eliminates all power loss and heat generating friction, delivers virtually uniform high pressure output for continuous spraying of the entire contents of its large capacity tank and minimizes necessary clean up by eliminating any valving or seats in the fluid train.

BRIEF SUMMARY OF THE INVENTION

This invention is directed to a single stroke pressure viscous liquid pump for discharging highly viscous and abrasive filled liquids under pressure sufficient for spray coating a surface with such liquids. The device includes an upright liquid tank having an open upper end positioned atop a base plate of a frame in coaxial alignment spaced directly beneath a pressure cylinder which includes an axially movable ram having a piston at its lower end. The piston is sized to sealingly engage the inner surface of the tank whereby downward axial force generated by the ram is transmitted virtually without losses directly against the upper surface of the liquid within the tank. A discharge outlet near the bottom of the tank is connectable to a conduit and liquid spray nozzle for spray application of the pressurized liquid discharged from the tank outlet. Only a single downstroke of the ram is required at a very slow feed rate to empty the tank of liquid, thus eliminating virtually all heat buildups within the system.

It is therefore an object of this invention to provide an improved high pressure spray delivery system for highly viscous liquid materials.

It is yet another object of this invention to provide a high pressure viscous liquid pump which is easily cleanable and refillable.

It is yet another object of this invention to provide a high pressure viscous liquid pump which eliminate virtually all detrimental heat of friction build up within the system.

It is yet another object of this invention to provide a high pressure viscous liquid pump which substantially reduces wear of its moving and sealing components.

It is yet another object of this invention to provide a high pressure viscous liquid pump which delivers viscous liquid under pressure for spray application at any constant desired spray pressure during the application of the entire tank contents.

It is yet another object of this invention to provide a high pressure viscous liquid pump which facilitates the airless spray application of virtually any liquid that can be poured.

It is yet another object of this invention to provide a high pressure viscous liquid pump which is virtually 100% efficient in utilizing power output toward the pressurization of the sprayed liquid.

It is yet another object of this invention to provide a high pressure viscous liquid pump which includes a unique air relief valve for facilitating more rapid refill of the tank and to prevent incorporation of entrapped air in the fluid.

It is yet another object of this invention to provide a high pressure viscous liquid pump which will not prematurely polymerize catalyzed liquid material being pumped by minimizing heat build up within this system.

In accordance with these and other objects which will become apparent hereinafter, the instant invention will now be described with reference to the accompanying drawings.

BRIEF DESCRIPTION OF THE DRAWINGS

FIG. 8 is a top plan view of the pressure chamber assembly of the present invention.

FIG. 9 is an elevation view in the direction of arrows 9—9 in FIG. 8.

FIG. 10 is an elevation view in the direction of arrows 10—10 in FIG. 8.

DETAILED DESCRIPTION OF THE INVENTION

Figure 1:
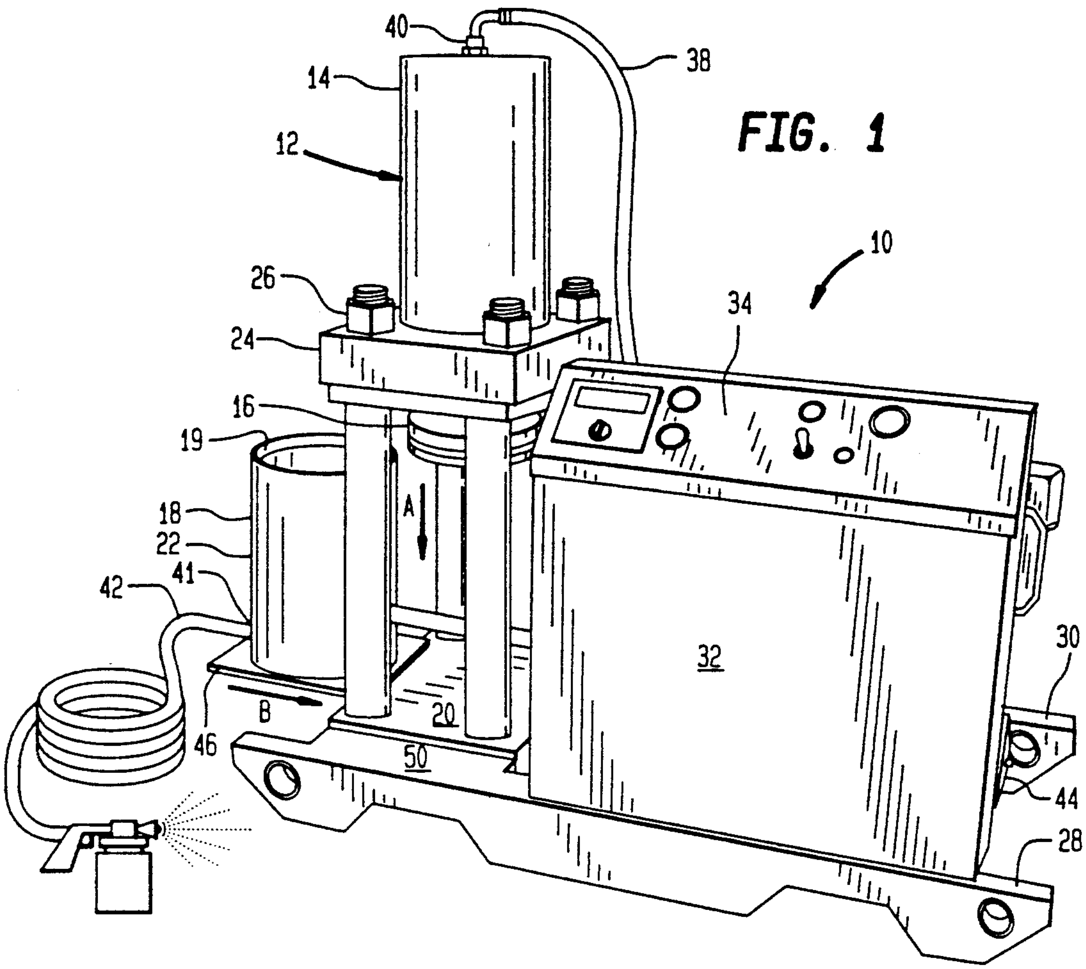
FIG. 1 is a perspective view of the entire system of the present invention with the hydraulic pump enclosure removed.

Referring now to the drawings, and particularly to FIGS. 1 to 6, the invention is shown generally at numeral 10 and includes a single stroke high pressure pump assembly 12 including a pressure cylinder 14 rigidly connected at its lower end to an upper plate 24. This upper plate 24 is held rigidly supported above a base plate or bed 20 of a horizontal frame 50 by four evenly spaced upright columns 22. Threaded nuts 26 engaged over the threaded upper and lower ends of each of the columns 22 retain this arrangement. An axially movable ram 16 as better seen in FIGS. 7 to 10, is held within the pressure cylinder 14 for pressure-controlled movement up and down in the direction of arrow A.

Figure 2:
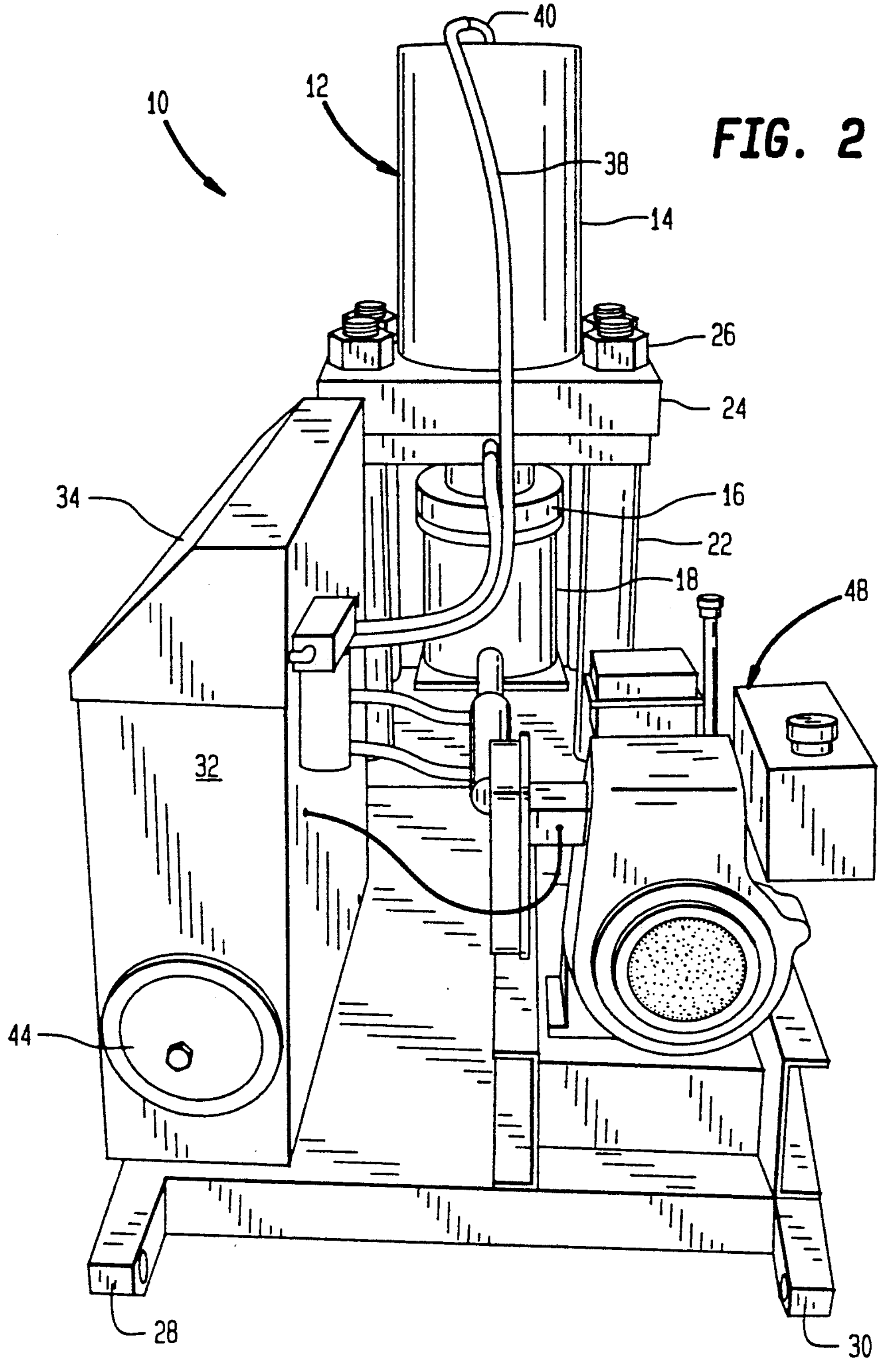
FIG. 2 is a right end perspective view of FIG. 1.
Figure 3:
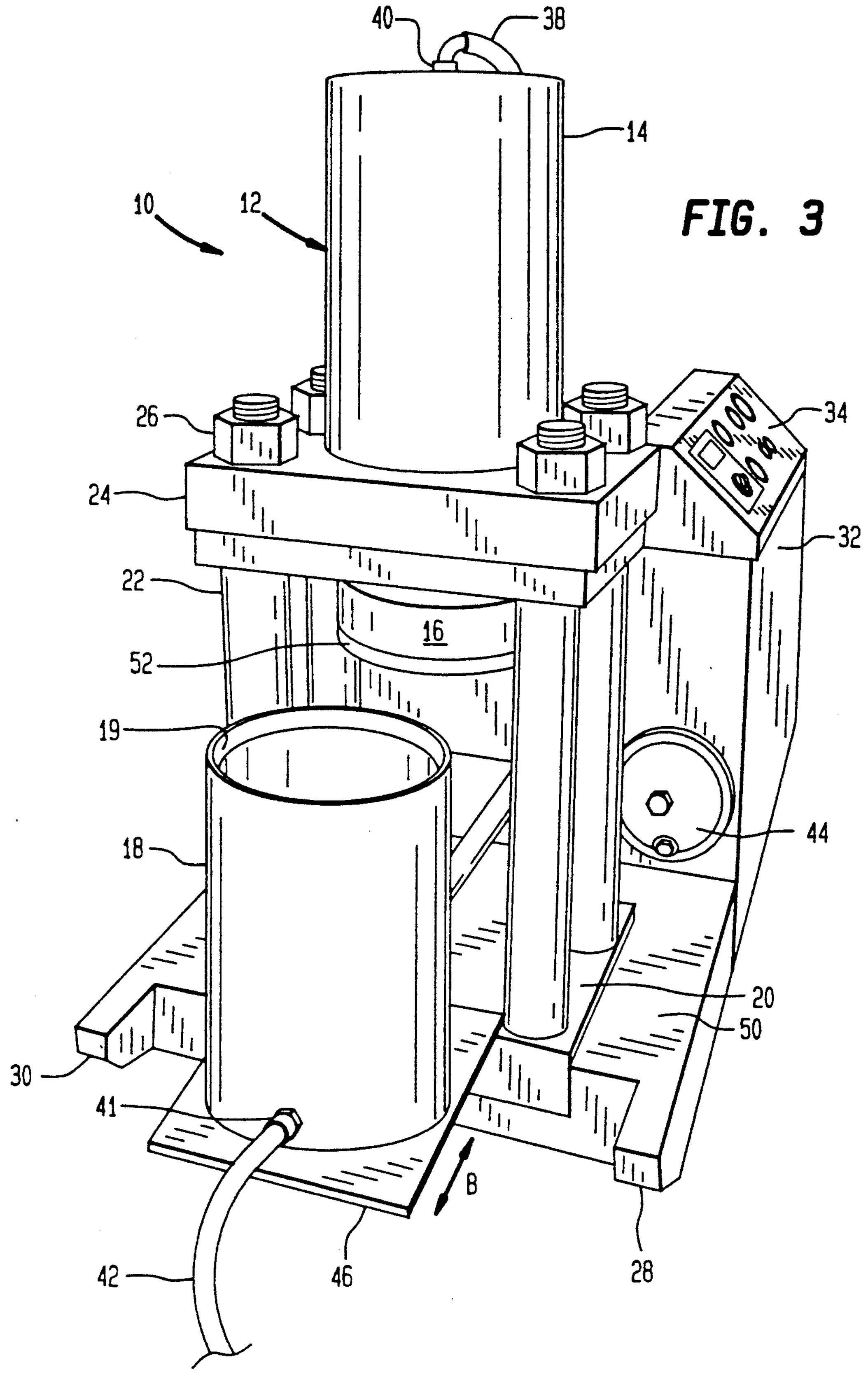
FIG. 3 is a left end perspective view of FIG. 1.
Figure 4:
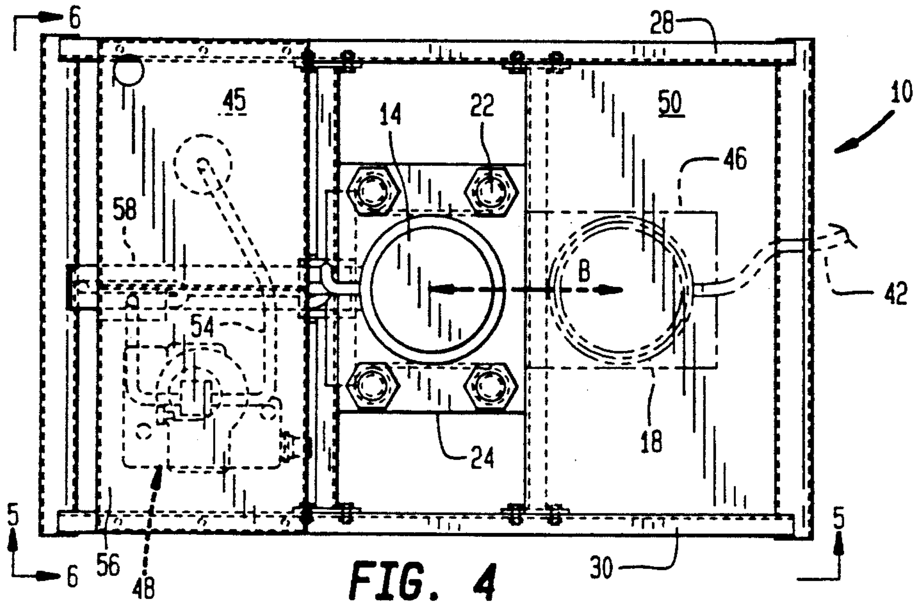
FIG. 4 is a top plan view of FIG. 1 with the hydraulic pump enclosure installed.
Figure 5:
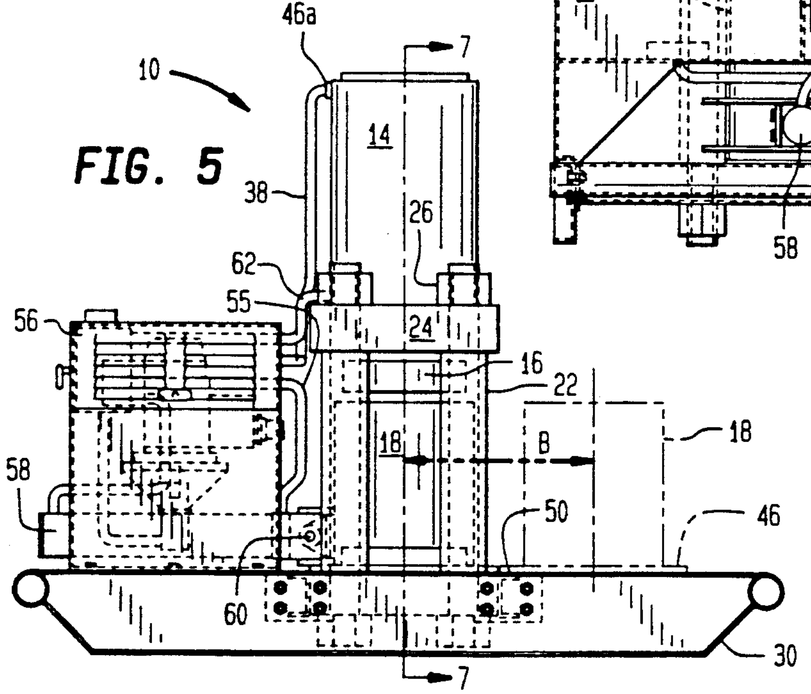
FIG. 5 is a rear elevation view in the direction of arrows 5—5 in FIG. 4.
Figure 7:
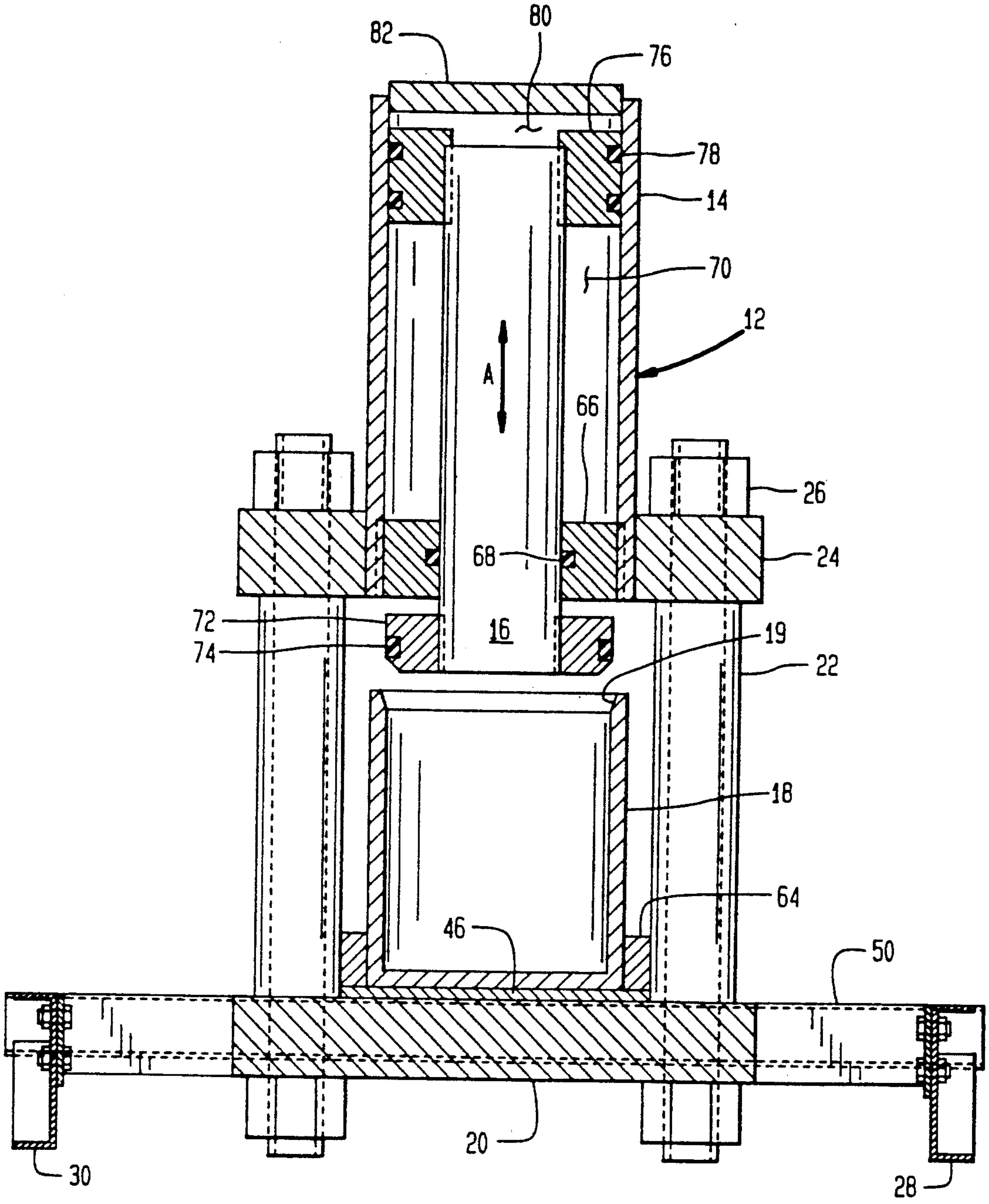
FIG. 7 is a section view in the direction of arrows 7—7 in FIG. 5.

A liquid tank 18 having a sealed bottom and upright cylindrical walls upwardly extending to an open end thereof for holding a large supply of any desired viscous liquid ready for pressurized spray distribution, is positionable between an in-use position directly in alignment spaced immediately beneath the ram 16 as best seen in FIGS. 5, 7, 9 and 10 and a fill position as best seen in FIGS. 1, 2, and 3 and in phantom in FIGS. 4 and 5. To accomplish this alternate positioning, tank 18 rests atop a sliding plate 46 which is slidably movable by a hydraulic retractor cylinder arrangement 58 back and forth in the direction of arrow B between the two positions. The sliding plate 46 is mounted within channels 64 atop base plate 20. Tank 18 includes an outlet 41 positioned adjacent its lower end connected to a flexible spray hose 42 having a spray nozzle at its distal end (not shown).

Figure 6:
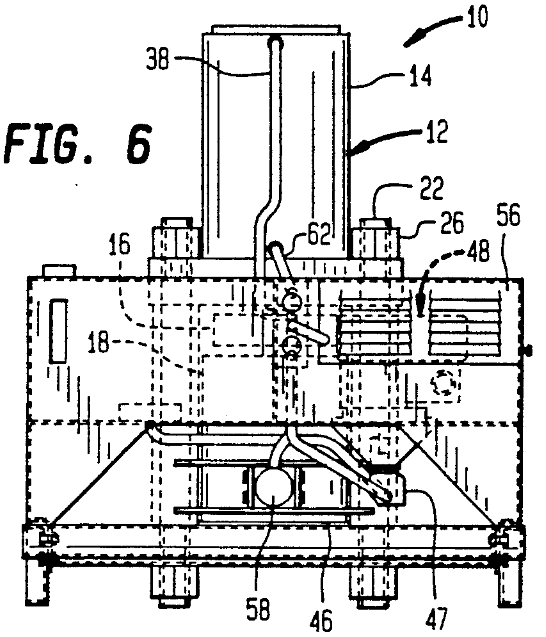
FIG. 6 is an end elevation view of FIG. 4 in the direction of arrows 6—6.

The system 10 also includes a self-energized fuel-powered internal combustion engine 48 mounted on frame 50 which provides pressurized fluid through flexible conduit 38 into inlet 40 at the upper end of the pressure cylinder 14. A filter cover 44 is also provided in the hydraulic fluid reservoir 45. A high pressure fluid pump 47 in FIG. 6 is driven by the internal combustion engine 48 or other power source providing pressurized fluid into conduit 38. A control housing 32 having a control panel 34 is also provided so as to regulate the system 10. For mobility, skids 28 and 30 connected to support the frame 50 allow the system to be dragged with the assistance of a powered vehicle.

In the preferred embodiment 10, a louvered enclosure 56 is provided to protectively encase the internal combustion engine 48 as seen in FIGS. 4, 5 and 6, and a hydraulic reservoir 45. The hydraulic pump 47 also provides the hydraulic pressure necessary for actuator 58 which moves the tank 18 horizontally in the direction of arrow B as previously described. An oil supply line 54 as seen in FIG. 4 connects reservoir 45 and pump 48. In FIG. 5, a fluid line 55 connects a control valve of pump 47 to retractor cylinder 58.

Referring particularly to FIGS. 7 to 10, the pressure cylinder 14, ram 16, and tank 18 as an assembly is there shown at 12. Ram 16, movable up and down in the direction of arrow A within pressure cylinder 14, includes a connected upper seal ring 76 having high pressure fluid annular seals 78 connected within a mating groove therearound which acts against the inner cylindrical surface of pressure cylinder 14. A lower sealing ring 66, connected at the lower end of pressure cylinder 14 also includes high pressure annular seals 68 acting against the outer cylindrical surface of the ram 16. By this arrangement, as high pressure fluid in the range of 3,000 psi hydraulic pressure is introduced into inlet 46*a* and chamber 80, the ram 16 is driven downwardly. To move the ram 16 upwardly the hydraulic pressure in chamber 80 is released and fluid pressure is then introduced through inlet 62 and into chamber 70, thus retracting the ram 16 upwardly.

The tank 18 includes an inner bevel 19 at its upper end so that piston 72 connected to the lower end of ram 16 and its annular pressure seal 74 will easily self-align as the piston 72 descends into the tank 18 when the tank 18 is positioned in its in-use position aligned beneath ram 16. This bevel 19 also prevents unintended seal 74 deformation.

Figure 11:
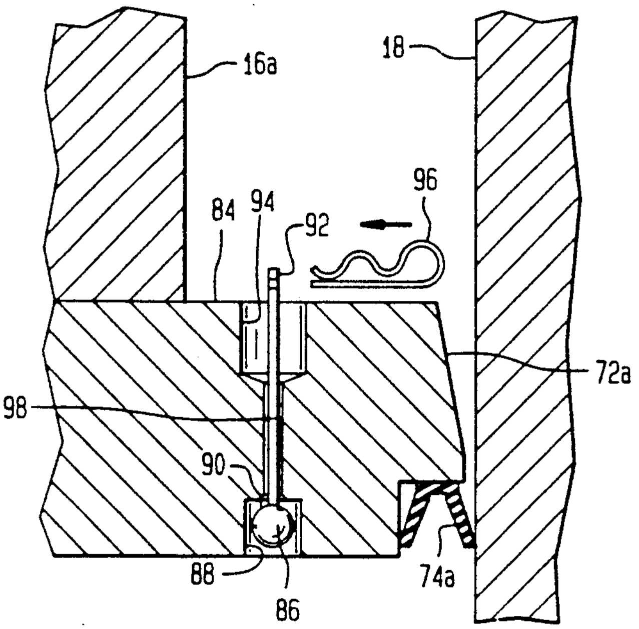
FIG. 11 is an enlarged elevation section view of the edge of an alternate, preferred embodiment of the piston and ram positioned within the liquid tank of the present invention.

Referring now to FIG. 11, an alternate and preferred embodiment is shown of the piston 72a connected at the lower end of ram 16a. Elastomeric annular seal 74a is connected into a groove formed at the lower edge of piston 72a so as to sealingly act against the inner wall of tank 18 as shown.

Connected within the piston 72a is a ball valve 86 having an elongated upright stem 92 slidably mounted within an enlarged cylindrical bore 98. The lower end of bore 98 is enlarged at 88 to form a valve seat 90 formed centrally to sealably receive ball valve 86. An enlarged solvent well 94 is formed at the upper end of the bore 98 as shown. A retaining pin 96 engagable through a mating aperture formed into stem 92 prevents the ball valve 86 from falling by gravity out of the bore 98.

In operation, as the piston 72a descends into the tank 18, ball valve 86 is in its open unseated position by gravity as shown. In this position, air trapped within tank 18 is allowed to quickly evacuate through the clearance between stem 92 and bore 98 to atmosphere. However, when the piston 72a contacts the relatively highly viscous liquid to be dispensed contained within the tank 18, the ball valve 86 is urged upwardly so as to seal against seat 90. Thereafter, the pressure immediately builds so as to begin pressure dispensing of the viscous liquid within the tank 18. To insure proper free movement of stem 92, a small amount of solvent may be placed within solvent well 92 just prior to or during this downstroke.

After the desired amount of viscous liquid has been dispensed from the tank 18, the ram 16a and piston 72a are then retracted upwardly from tank 18. Because seal 74a acts uniformly in either direction of movement of piston 72a, an immediate vacuum or suction is created within tank 18 beneath the piston 72a. This vacuum draws the ball valve 86 downwardly to the limit permitted by retaining pin 96, drawing any solvent within solvent well 94 downwardly through valve bore 98 to help to unseat the ball valve 86 and then immediately allowing air to flow into the interior of the tank 18 below seal 74a. Thus, in addition to facilitating the quick insertion of the piston 72a down to the level of the liquid within tank 18, this valve arrangement facilitates the relatively free retraction of the piston 72a upwardly from the tank 18 after liquid pumping.

It is here again noted that this system 10 is of a single stroke nature wherein a very slowly moving ram and piston pressurize and evacuate highly viscous coating liquids for spray application from a separate large-capacity tank open at its upper end for filling and to sealably receive the pressurizing piston. Because of the very slow, constant downward movement of the piston and ram (in the range of ten (10) inches per minute into a 5-gallon capacity tank having a diameter of twelve (12) inches), virtually no heat buildup is present, even though spray pressurization of the liquid may reach upward in the range of 4500 p.s.i.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An apparatus for pressurizing and discharging a highly viscous liquid for spraying comprising a single stroke high pressure viscous liquid pump, said liquid pump consisting essentially of:

a liquid tank having a bottom and a cylindrical upright wall connected to and upwardly extending from said bottom to define an open upper end of said tank;

said tank supported atop a rigid horizontal base plate of a frame;

an elongated ram slidably positioned for longitudinal movement within an upright pressure cylinder, said pressure cylinder connected to said base plate in axial upright alignment with, and positioned above said tank;

a piston connected to a lower end of said ram, said piston sized for sliding up and down movement within said tank in response to a corresponding movement of said ram;

said ram having an upper retracted position wherein said piston is positioned above said tank open upper end and an extended position wherein said piston is positioned within said tank;

first sealing means positioned around said ram for sealable engagement against an inner wall of said pressure cylinder whereby a pressurized fluid being introduced within said pressure cylinder at an upper end of said ram urges said ram to move downwardly from said retracted position to said extended position with corresponding movement of said piston into said tank;

second sealing means positioned around said piston for sealable engagement against an inner surface of said tank wall and for preventing the viscous liquid within said tank from passing upwardly around said second sealing means in response to downward movement of said piston within said tank;

a liquid outlet connected through said tank wall immediately adjacent said bottom and laterally extending from said tank wall whereby the viscous liquid discharges from said tank under high pressure through said outlet in response to downward urging of said ram.

2. An apparatus as set forth in claim 1, further comprising:

a sliding plate slidably connected to said base plate and supportively positioned beneath said tank whereby said tank is horizontally movable from an in-use position in alignment beneath said pressure cylinder to a fill position.

3. An apparatus as set forth in claim 2, further comprising:

a pressure actuator connected between said frame and said sliding plate structured, in response to controlled internal pressure within said actuator, to move said tank back and forth between said in-use position and said fill position.

4. An apparatus as set forth in claim 2, wherein:

said tank opening is beveled along an inner margin thereof whereby said piston is self-aligning with said tank as said piston enters said tank.

5. An apparatus as set forth in claim 1, further comprising:

a hydraulic pump mounted on said frame structured for controlled introduction of the pressurized fluid into said pressure cylinder at said ram upper end.

6. A method of high pressure dispensing of a highly viscous liquid comprising the steps of:

A. supporting a liquid tank containing the viscous liquid atop a rigid horizontal base plate of a frame, said tank having a bottom and an upright cylindrical wall connected to and upwardly extending from said bottom to define an open upper end of said tank;

B. introducing a pressurized fluid into an upright pressure cylinder connected to said base plate in axial upright alignment with, and positioned above, said tank said pressurized fluid being introduced above an elongated ram slidably positioned for longitudinal movement within said pressure cylinder;

said ram having a piston connected to a lower end thereof sized for sliding up and down movement within said tank in response to a corresponding movement of said ram;

said ram having an upper retracted position wherein said piston is positioned spaced above said tank open upper end and an extended position wherein said piston is positioned within said tank;

said ram having a first sealing means positioned around said ram for sealable engagement against an inner wall of said pressure cylinder whereby a pressurized fluid being introduced within said pressure cylinder at an upper end of said ram urges said ram to move downwardly from said retracted position to said extended position with corresponding movement of said piston into said tank;

said piston having a second sealing means positioned around said piston for sealable engagement against an inner surface of said tank wall and for preventing the viscous liquid within said tank from passing upwardly around said second sealing means in response to downward movement of said piston within said tank;

said tank having a liquid outlet connected through said tank wall immediately adjacent said bottom and laterally extending from said wall whereby the viscous liquid exits from said tank under high pressure through said outlet in response to fluid pressurization downward urging of said ram;

C. spray dispensing said viscous liquid from a spray nozzle, said spray nozzle connected by a flexible tubing to said liquid outlet.

* * * * *